(12) United States Patent
Peng et al.

(10) Patent No.: US 12,177,854 B2
(45) Date of Patent: Dec. 24, 2024

(54) METHOD AND DEVICE FOR RESOURCE CONFIGURATION

(71) Applicant: VIVO MOBILE COMMUNICATION CO., LTD., Guangdong (CN)

(72) Inventors: Shuyan Peng, Dongguan (CN); Zichao Ji, Dongguan (CN); Qian Zheng, Dongguan (CN); Jianping Zhou, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 720 days.

(21) Appl. No.: 17/168,385

(22) Filed: Feb. 5, 2021

(65) Prior Publication Data

US 2021/0160834 A1 May 27, 2021

Related U.S. Application Data

(63) Continuation of application No. PCT/CN2019/096311, filed on Jul. 17, 2019.

(30) Foreign Application Priority Data

Aug. 6, 2018 (CN) .......................... 201810885871.4

(51) Int. Cl.
*H04W 72/23* (2023.01)
(52) U.S. Cl.
CPC .................................. *H04W 72/23* (2023.01)
(58) Field of Classification Search
None
See application file for complete search history.

(56) References Cited

U.S. PATENT DOCUMENTS

| | | | |
|---|---|---|---|
| 2016/0381666 A1 | 12/2016 | Kim et al. | |
| 2019/0075546 A1 | 3/2019 | Yasukawa et al. | |
| 2020/0059896 A1 | 2/2020 | Xu et al. | |
| 2020/0163155 A1* | 5/2020 | Lee ....................... | H04W 72/23 |

FOREIGN PATENT DOCUMENTS

| | | |
|---|---|---|
| CN | 106063352 A | 10/2016 |
| CN | 106792885 A | 5/2017 |
| CN | 107734557 A | 2/2018 |
| CN | 108024264 A | 5/2018 |

(Continued)

OTHER PUBLICATIONS

International Search Report and Written Opinion of the International Searching Authority regarding International Patent Application No. PCT/CN2019/096311, dated Sep. 26, 2019. Translation provided by Bohui Intellectual Property.

(Continued)

*Primary Examiner* — Suhail Khan
(74) *Attorney, Agent, or Firm* — Harness, Dickey & Pierce, P.L.C.

(57) ABSTRACT

A method for resource configuration includes determining that a first resource and a second resource are multiplexed in a first target mode. The first resource is a candidate resource, on the SL, configured to transmit control information. The second resource is a candidate resource, on the SL, configured to transmit data. The first target mode is time-division multiplexing (TDM) or frequency-division multiplexing (FDM).

17 Claims, 7 Drawing Sheets

(56) References Cited

FOREIGN PATENT DOCUMENTS

| | | | |
|---|---|---|---|
| EP | 3182767 A2 | 6/2017 | |
| WO | WO-2017077976 A1 | 5/2017 | |
| WO | WO-2017135998 A1 | 8/2017 | |
| WO | WO-2018027822 A1 | 2/2018 | |
| WO | WO-2019062746 A1 * | 4/2019 | ............ H04W 24/02 |

OTHER PUBLICATIONS

"NR Sidelink Resource Allocation," VIVO, 3GPP, TSG RAN WG1 Meeting #94, R1-1808245, Aug. 20-24, 2018.

First Office Action regarding Chinese Patent Application No. 201810885871.4, dated Jul. 20, 2020. Translation provided by Bohui Intellectual Property.

Second Office Action regarding Chinese Patent Application No. 201810885871.4, dated Oct. 13, 2020. Translation provided by Bohui Intellectual Property.

"Resource allocation and latency reduction enhancements for V2X," Samsung, 3GPP TSG RAN WG1 Meeting #83, Nov. 15-22, 2015.

Supplementary European Search Report regarding Application No. 19847409.0-1205/3832936, PCT/CN2019/096311, dated Aug. 5, 2021.

"Sidelink Resource Allocation and Configuration for Wearable and IoT Use Cases," Intel Corporation, 3GPP TSG RAN WG1 Meeting #90, R1-1712518, dated Aug. 25, 2017.

"Discussion on sidelink resource allocation and pool configuration for IoT and wearables," LG Electronics, 3GPP TSG RAN WG1 Meeting #89, R1-1707584, dated May 19, 2017.

"Discussion on sidelink resource allocation and configuration," Huawei, et al., 3GPP TSG RAN WG1 Meeting #90, R1-1712135, dated Aug. 25, 2017.

First Office Action regarding European Patent Application No. 19847409.0, dated Mar. 21, 2024.

First Office Action regarding Japanese Patent Application No. 2021-506691, dated Apr. 4, 2022. Translation provided by Bohui Intellectual Property.

* cited by examiner

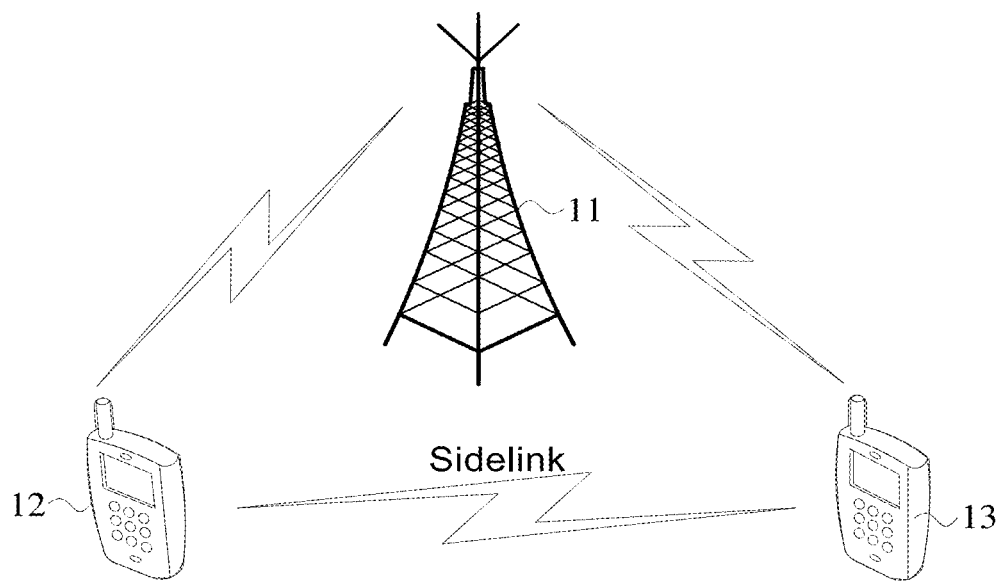
FIG. 1
Determining that a first resource and a second resource are multiplexed in a first target mode —S11
FIG. 2
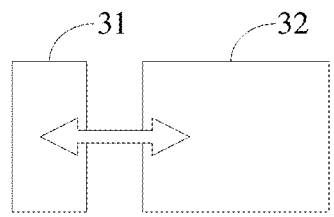
FIG. 3

METHOD AND DEVICE FOR RESOURCE CONFIGURATION

CROSS-REFERENCE TO RELATED APPLICATIONS

This application is a Bypass Continuation Application of PCT/CN2019/096311 filed on Jul. 17, 2019, which claims priority to Chinese Patent Application No. 201810885871.4 filed on Aug. 6, 2018, which are incorporated herein by reference in their entirety.

TECHNICAL FIELD

The present disclosure relates to the field of communication technologies, and in particular, to a method and a device for resource configuration.

BACKGROUND

The communication on a sidelink (SL) refers to a technology that enables direct communication between devices without transmitting or forwarding through a network side device such as a base station. The resource utilization rate and the network capacity may be improved by the sidelink communication, and therefore, the sidelink communication has a wide application prospect.

SUMMARY

In a first aspect, the embodiments of the present disclosure provide a method for resource configuration. The method for resource configuration includes:
determining that a first resource and a second resource are multiplexed in a first target mode;
wherein the first resource is a candidate resource, on a sidelink (SL), configured to transmit control information; the second resource is a candidate resource, on the SL, configured to transmit data; and the first target mode is time-division multiplexing (TDM) or frequency-division multiplexing (FDM).

In a second aspect, the embodiments of the present disclosure provide a device for resource configuration. The device for resource configuration includes:
a first configuration unit used to determine that a first resource and a second resource are multiplexed in a first target mode;
wherein the first resource is a candidate resource, on an SL, configured to transmit control information; the second resource is a candidate resource, on an SL, configured to transmit data; and the first target mode is time-division multiplexing (TDM) or frequency-division multiplexing (FDM).

In a third aspect, the embodiments of the present disclosure provide a terminal device. The terminal device includes: a processor, a memory, and a computer program stored on the memory and executed on the processor. The computer program, when executed by the processor, causes the terminal device to perform the following step: determining that a first resource and a second resource are multiplexed in a first target mode. The first resource is a candidate resource, on a sidelink, configured to transmit control information. The second resource is a candidate resource, on the SL, configured to transmit data; and the first target mode is time-division multiplexing or frequency-division multiplexing.

In a fourth aspect, the embodiments of the present disclosure provide a non-transitory computer-readable storage medium. The non-transitory computer-readable storage medium stores thereon a computer program that, when executed by a processor, implements the following step: determining that a first resource and a second resource are multiplexed in a first target mode. The first resource is a candidate resource, on a sidelink, configured to transmit control information. The second resource is a candidate resource, on the SL, configured to transmit data; and the first target mode is time-division multiplexing or frequency-division multiplexing.

BRIEF DESCRIPTION OF THE DRAWINGS

FIG. 1 is a possible schematic structural diagram of a communication system, in accordance with the embodiments of the present disclosure;

FIG. 2 is a flow diagram showing steps in a method for resource configuration, in accordance with embodiments of the present disclosure;

FIG. 3 is a schematic structural diagram of resource pools, in accordance with embodiments of the present disclosure;

DETAILED DESCRIPTION

Figure 4:
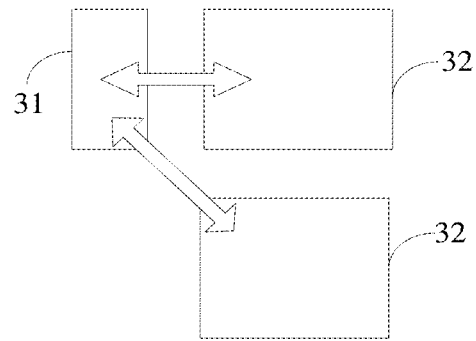
FIG. 4 is another schematic structural diagram of resource pools, in accordance with embodiments of the present disclosure.

Technical solutions in embodiments of the present disclosure will be described below clearly and completely with reference to accompanying drawings in the embodiments of the present disclosure. However, the described embodiments are merely some but not all embodiments of the present disclosure. All other embodiments obtained on a basis of the embodiments of the present disclosure by a person of ordinary skill in the art without paying any creative effort shall be included in the protection scope of the present disclosure.

The term "and/or" herein is merely used to describe an association relationship of associated objects, which represents three kinds of relationships. For example, the phrase "A and/or B" represents three conditions: A existing alone, both A and B existing, and B existing alone. In addition, the character "/" herein generally indicates that the associated objects are in an "or" relationship. The character "/" in a formula indicates that the associated objects are in a "division" relationship. The term "a/the plurality of" herein means two or more unless otherwise specified.

In order to describe clearly the technical solutions of the embodiments of the present disclosure, in the embodiments of the present disclosure, words such as "first" and "second" are used to distinguish identical items or similar items with substantially same function or effect, and those skilled in the art can understand that words such as "first" and "second" do not limit the quantity and execution order.

In general, the process for a terminal device to receive data is as follows: firstly, receiving control information, and demodulating the received control information so as to determine information such as a size of a transmission block, a modulation coding mode, allocated resources; then receiving data on the corresponding resources according to the information such as the size of the transmission block, the modulation coding mode, the allocated resources, and demodulating the received data. Generally, for resources for transmitting control information and for transmitting data, methods of multiplexing time-frequency resources include time-division multiplexing (TDM) and frequency-division multiplexing (FDM). For example, on an SL of long term evolution (LTE) device-to-device (D2D), a physical sidelink control channel (PSCCH) carrying scheduling assignment (SA) and a physical sidelink shared channel (PSSCH) carrying data are multiplexed in a TDM mode. In another example, in LTE vehicle to everything (V2X), the PSCCH carrying SA information and the PSSCH carrying data are multiplexed in an FDM mode. Compared with TDM, the time delay of data transmission in the FDM mode is smaller; however, the FDM mode has a higher requirement for a processing capability of the terminal device. However, in different scenarios, a processing capability of the terminal device may be different, and the requirement for the time delay of data transmission may be also different. For example, in application scenarios that have a low requirement for time delay, such as distant traffic conditions prompt, weather information forecasts, the TDM may be used to multiplex resources for transmitting control information and resources for transmitting data, so as to reduce the requirements for the terminal device performance; and in application scenarios which have a high requirement for time delay, such as emergency brake indication, overtaking indication, FDM may be used to multiplex resources for transmitting control information and resources for transmitting data, so as to reduce the time delay of data transmission.

In summary, how to configure the resources for transmitting control information and the resources for transmitting data on the SL is a problem that needs to be solved urgently.

In the embodiments of the present disclosure, words such as "exemplary" or "for example" are used for illustration, explanation, or explication. Any embodiment or design described as "exemplary" or "for example" in the embodiments of the present disclosure shall not be necessary to be construed as more preferable or advantageous than other embodiments or designs. Specifically, the use of words such as "exemplary" or "for example" is intended to present relevant concepts in a concrete way. In the embodiments of the present disclosure, the term "a/the plurality of" means two or more unless otherwise specified.

FIG. 1 shows a possible schematic structural diagram of a communication system, in accordance with embodiments of the present disclosure. As shown in FIG. 1, the communication system may include: a network side device 11 (FIG. 1 shows an example in which the network side device is a base station), a first terminal device 12, and a second terminal device 13 (FIG. 1 shows an example in which both the first terminal device and the second terminal device are mobile phones). A wireless connection is established, through radio resource control (RRC), between the network side device 11 and the first terminal device 12, the second terminal device 13, respectively. A sidelink is established between the first terminal device 12 and the second terminal device 13.

The network side device 11 in the communication system involved in the embodiments of the present disclosure may be a base station, a core network device, a transmission and reception point (TRP), a relay station, or an access point, etc. Moreover, the network side device 11 may be also a base transceiver station (BTS) in a global system for mobile communication (GSM) or a code division multiple access (CDMA) network, may be also a NodeB (NB) in the wideband code division multiple access (WCDMA), or may be also an eNB or evolutional NodeB (eNodeB) in LTE. The network side device 11 may be also a wireless controller in scenarios of a cloud radio access network (CRAN). The network side device 11 may be also a base station (gNB) in a 5th-generation (5G) communication system or a network side device in a future evolution network.

The first terminal device 12 and the second terminal device 13 may be wireless user equipments (UEs). The wireless UE may refer to a device providing voice and/or other service data connectivity to a user, a handheld device having a wireless communication function, a computing device, other processing devices connected to a wireless modem, a vehicle-mounted device, a wearable device, a UE in a future 5G network, or a UE in a future evolution PLMN network, etc. The wireless UE may communicate with one or more core networks via a radio access network (RAN), and the wireless UE may be a mobile terminal such as a mobile phone (or referred to as a "cellular" phone) and a computer having a mobile terminal. For example, the wireless UE may be a portable mobile device, a pocket mobile device, a hand-held mobile device, a built-in mobile device of a computer, or a vehicle-mounted mobile device, which exchanges voice and/or data with the RAN; or the wireless UE may be a personal communication service (PCS) phone, a cordless phone, a session initiation protocol (SIP) phone, a wireless local loop (WLL) station, a personal digital assistant (PDA), and the like. The wireless terminal may be also a mobile device, a UE terminal, an access terminal, a wireless communication device, a terminal unit, a terminal station, a mobile station, a remote station, a remote terminal, a subscriber unit, a subscriber station, a user agent, a terminal device, and the like. As an example, in the embodiments of the present disclosure, FIG. 1 shows an example in which the terminal is a mobile phone.

It will be noted that, the communication system shown in FIG. 1 is only a possible schematic structural diagram of the communication system involved in the embodiments of the present disclosure, and the embodiments of the present disclosure are not limited thereto. The communication system involved in the embodiments of the present disclosure may be also other systems, for example, only the first terminal device 12 and the second terminal device 13 are included, a sidelink is established between the first terminal device 12 and the second terminal device 13, and the network side device 11 is not included.

An executive subject of a method for resource configuration provided by the embodiments of the present disclosure may be the above receiving side terminal device that communicates on the sidelink, and may be also a functional module and/or a functional entity of a receiving side terminal device communicating on the sidelink, which can implement the method for resource configuration. The executive subject may be determined according to an actual use needs, and is not limited by the embodiments of the present disclosure.

The embodiments of the present disclosure provide a method for resource configuration. For example, referring to FIG. 2, the method for resource configuration includes the following steps.

In step 11 (S11), determining that a first resource and a second resource are multiplexed in a first target mode.

The first resource is a candidate resource, on an SL, configured to transmit control information. The second resource is a candidate resource, on the SL, configured to transmit data. The first target mode is TDM or FDM.

That is, the candidate resource on the SL configured to transmit control information and the candidate resource on the SL configured to transmit data are multiplexed in a TDM mode, or the candidate resource configured to transmit control information and the candidate resource on the SL configured to transmit data are multiplexed in an FDM mode.

For example, the control information may be scheduling assignment (SA) information.

Optionally, the first target mode in the above embodiment may be determined by any one of the following manners.

In a first manner, the first target mode is preconfigured by a network.

In a second manner, the first target mode is configured by a network side device for a terminal device.

In a third manner, the first target mode is defined by the terminal device.

In a fourth manner, the first target mode is configured by a transmitting side terminal device for a receiving side terminal device.

In a fifth manner, the first target mode is predefined by a protocol.

Further, the following will describe an implementation solution of the second manner (in which the first target mode is configured by the network side device for the terminal device) in detail.

In a first aspect, an implementation solution of the second manner (in which the first target mode is configured by the network side device for the terminal device) may be that:
 a multiplexing mode of a resource pool of the first resource and a resource pool of the second resource is configured by the network side device.

For example, if the multiplexing mode between the resource pool of the first resource and the resource pool of the second resource is configured as the TDM by the network side device, then a multiplexing mode between a resource selected from the resource pool of the first resource by the terminal device for transmitting control information and a resource selected from the resource pool of the second resource by the terminal device for transmitting data must be the TDM. Therefore, the multiplexing mode between the resource pool of the first resource and the resource pool of the second resource may be configured to be TDM by the network side device, so that the first target mode is configured to be the TDM.

In another example, the multiplexing mode between the resource pool of the first resource and the resource pool of the second resource is configured as the FDM by the network side device, and then the multiplexing mode between the resource selected from the resource pool of the first resource by the terminal device for transmitting control information and the resource selected from the resource pool of the second resource by the terminal device for transmitting data must be the FDM. Therefore, the multiplexing mode between the resource pool of the first resource and the resource pool of the second resource may be configured to be the FDM by the network side device, so that the first target mode is configured to be the FDM.

In a second aspect, the implementation solution of the second manner (in which the first target mode is configured by the network side device for the terminal device) may be also that:
 the first target mode is configured for the terminal device by the network side device via a Uu interface.

That is, the network side device configures the first target mode for the terminal device via the Uu interface.

Optionally, a way that the first target mode is configured for the terminal device by the network side device via the Uu interface includes:
 a radio resource control (RRC) signaling being sent to the terminal device by the network side device via the Uu interface. The RRC signaling carries indication information; and the indication information is used to indicate the first target mode.

Further optionally, a way of carrying the indication information in the RRC signaling includes:
 the indication information being jointly encoded with at least one piece of information in the RRC signaling.

Further optionally, the way of carrying the indication information in the RRC signaling includes:
 the RRC signaling including at least one target bit, The target bit is a bit used to carry the indication information.

Optionally, a way that the first target mode is configured for the terminal device by the network side device via the Uu interface includes:
 downlink control information (DCI) being sent to the terminal device by the network side device via the Uu interface. The DCI carries the indication information, and the indication information is used to indicate the first target mode.

Further optionally, a way of carrying the indication information in the DCI includes:
 the indication information being jointly encoded with at least one piece of information in the DCI.

Further optionally, the way of carrying the indication information in the DCI includes:
 the DCI including at least one target bit. The target bit is a bit used to carry the indication information.

In a third aspect, the implementation solution of the second manner (in which the first target mode is configured by the network side device for the terminal device) may be also that:
 the first target mode is configured for the terminal device by the network side device via a PC5 interface.

That is, the network side device configures the first target mode for the terminal device via the PC5 interface.

Optionally, a way that the first target mode is configured for the terminal device by the network side device via the PC5 interface includes:

sidelink control information (SCI) being sent to the terminal device by the network side device via the PC5 interface. The SCI carries indication information; and the indication information is used to indicate the first target mode.

Further optionally, a way of carrying the indication information in the SCI includes:

the indication information being jointly encoded with at least one piece of information in the SCI.

Further optionally, the way of carrying the indication information in the SCI includes:

the SCI including at least one target bit. The target bit is a bit used to carry the indication information.

Optionally, the way of the first target mode being configured for the terminal device by the network side device via the PC5 interface includes:

an RRC signaling being sent to the terminal device by the network side device via the PC5 interface. The RRC signaling carries indication information, and the indication information is used to indicate the first target mode.

Further optionally, a way of carrying the indication information in the RRC signaling includes:

the indication information being jointly encoded with at least one piece of information in the RRC signaling.

Further optionally, the way of carrying the indication information in the RRC signaling includes:

the RRC signaling including at least one target bit. The target bit is a bit used to carry the indication information.

Further, the following will describe an implementation solution of the fourth manner (in which the first target mode is configured by the transmitting side terminal device for the receiving side terminal device) in detail.

The fourth manner (in which the first target mode is configured by the transmitting side terminal device for the receiving side terminal device) includes:

the first target mode being configured for the receiving side terminal device by the transmitting side terminal device via a PC5 interface.

Optionally, a way that the first target mode is configured for the receiving side terminal device by the transmitting side terminal device via the PC5 interface includes:

SL control information (SCI) being sent to the receiving side terminal device by the transmitting side terminal device via the PC5 interface. The SCI carries indication information, and the indication information is used to indicate the first target mode.

Further optionally, a way of carrying the indication information in the SCI includes:

the indication information being jointly encoded with at least one piece of information in the SCI.

Further optionally, the way of carrying the indication information in the SCI includes:

the SCI including at least one target bit. The target bit is a bit used to carry the indication information.

Optionally, the way of the first target mode being configured for the receiving side terminal device by the transmitting side terminal device via the PC5 interface includes:

an RRC signaling being sent to the receiving side terminal device by the transmitting side terminal device via the PC5 interface. The RRC signaling carries indication information, and the indication information is used to indicate the first target mode.

Further optionally, a way of carrying the indication information in the RRC signaling includes:

the indication information being jointly encoded with at least one piece of information in the RRC signaling.

Further optionally, the way of carrying the indication information in the RRC signaling includes:

the RRC signaling including at least one target bit. The target bit is a bit used to carry the indication information.

In the method for resource configuration provided by the above embodiment, it is determined that the first resource and the second resource are multiplexed in the first target mode. The first resource is the candidate resource on the SL configured to transmit control information, the second resource is the candidate resource on the SL configured to transmit data, and the first target mode is TDM or FDM. That is, in the embodiments of the present disclosure, the candidate resource on the SL configured to transmit control information and the candidate resource on the SL configured to transmit data are multiplexed in the TDM mode or the FDM mode. Since the embodiments of the present disclosure provide the multiplexing mode between the candidate resource configured to transmit control information and the candidate resource configured to transmit data, the problem of how to configure the resources on the SL for transmitting control information and for transmitting data may be solved by the embodiments of the present disclosure.

Further, the method for resource configuration provided by the above embodiment also includes:

configuring, with a second target mode, a control resource pool and a data resource pool.

The control resource pool is a resource pool of the first resource, and the data resource pool is a resource pool of the second resource.

Optionally, a way of configuring, with the second target mode, the control resource pool and the data resource pool includes:

configuring M control resource pools to be associated with N data resource pools;

M and N are non-negative integers.

For example, referring to FIG. 3, configuring the M control resource pools to be associated with the N data resource pools may be that one control resource pool 31 is configured to be associated with one data resource pool 32.

For example, referring to FIG. 4, configuring the M control resource pools to be associated with the N data resource pools may be also that one control resource pool 31 is configured to be associated with a plurality of data resource pools 32. FIG. 4 shows an example in which one control resource pool 31 is configured to be associated with two data resource pools 32.

Figure 5:
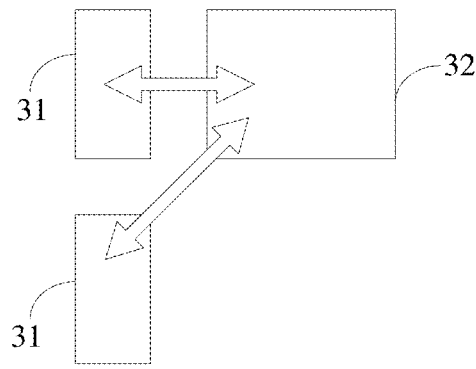
FIG. 5 is yet another schematic structural diagram of resource pools, in accordance with embodiments of the present disclosure.

For example, referring to FIG. 5, configuring the M control resource pools to be associated with the N data resource pools may be also that a plurality of control resource pools 31 are configured to be associated with one data resource pool 32. FIG. 5 shows an example in which two control resource pools 31 are configured to be associated with one data resource pools 32.

Further, when the M control resource pools are configured to be associated with the N data resource pools, and M and N are both positive integers, there is an intersection between a first carrier set and a second carrier set.

The first carrier set is a set composed of carriers on which each control resource pool in the M control resource pools is located; and the second carrier set is a set composed of carriers on which each control resource pool in the N data resource pools is located.

Figure 6:
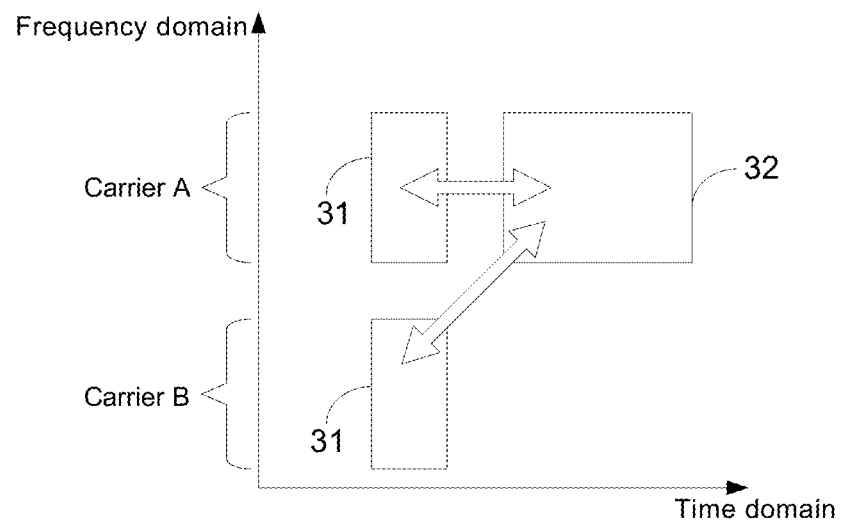
FIG. 6 is yet another schematic structural diagram of resource pools, in accordance with embodiments of the present disclosure.

For example, referring to FIG. 6, FIG. 6 shows an example in which two control resource pools 31 are associated with one data resource pool 32. As shown in FIG. 6, a first carrier set composed of carriers on which each control resource pool in the M control resource pools 31 is located includes a carrier A and a carrier B, and a second carrier set composed of carriers on which each control resource pool in the N data resource pools 32 is located includes a carrier A. In this case, there is an intersection between the first carrier set and the second carrier set, and the intersection is the carrier A.

Figure 7:
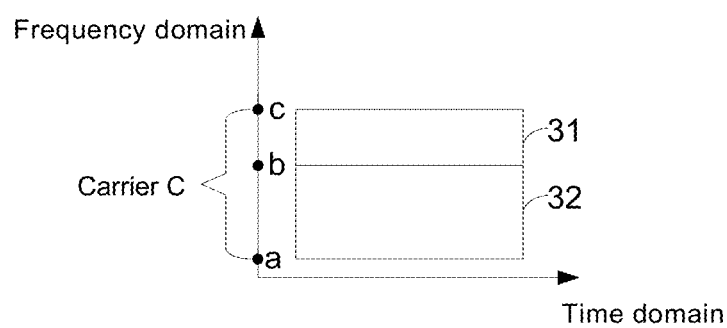
FIG. 7 is yet another schematic structural diagram of resource pools, in accordance with embodiments of the present disclosure.

It will be noted that, when there is the intersection between the first carrier set and the second carrier set, there may be no intersection between a frequency set on which each control resource pool in the M control resource pools is located and a frequency set on which each data resource pool in the N data resource pools is located. For example, as shown in FIG. 7, there is an intersection between a first carrier set and a second carrier set, and the only intersection is a carrier C, but a frequency set on which each control resource pool in the M control resource pools is located includes only a part of frequencies (frequency b to frequency c) of the carrier C, and a frequency set on which each control resource pool in the N data resource pools is located includes only another part of frequencies (frequency a to frequency b) of the carrier C. In this case, there is an intersection (the carrier C) between the first carrier set and the second carrier set, and there is no intersection between the frequency set on which each control resource pool in the M control resource pools is located and the frequency set on which each data resource pool in the N data resource pools is located.

Further, when the M control resource pools are configured to be associated with the N data resource pools, and M and N are both positive integers, there may be no intersection between the first carrier set and the second carrier set.

The first carrier set is a set composed of carriers on which each control resource pool in the M control resource pools is located; and the second carrier set is a set composed of carriers on which each control resource pool in the N data resource pools is located.

Figure 8:
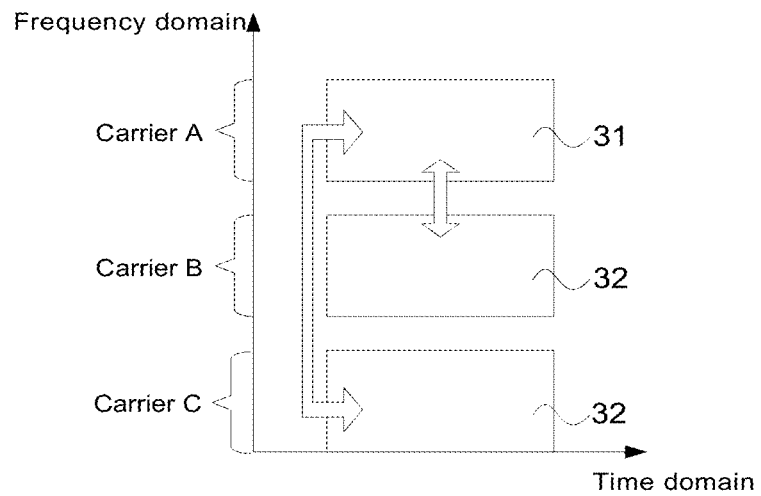
FIG. 8 is yet another schematic structural diagram of resource pools, in accordance with embodiments of the present disclosure.

For example, referring to FIG. 8, FIG. 8 shows an example in which one control resource pool 31 is associated with two data resource pools. As shown in FIG. 8, a first carrier set composed of carriers on which each control resource pool in the M control resource pools 31 is located includes a carrier A, and a second carrier set composed of carriers in which each control resource pool in the N data resource pools 32 is located includes a carrier B and a carrier C. In this case, there is no intersection between the first carrier set and the second carrier set.

Optionally, the way of configuring the control resource pool and the data resource pool in the second target mode includes:
configuring, in one resource pool, at least one control resource pool and at least one data resource pool.

Figure 9:
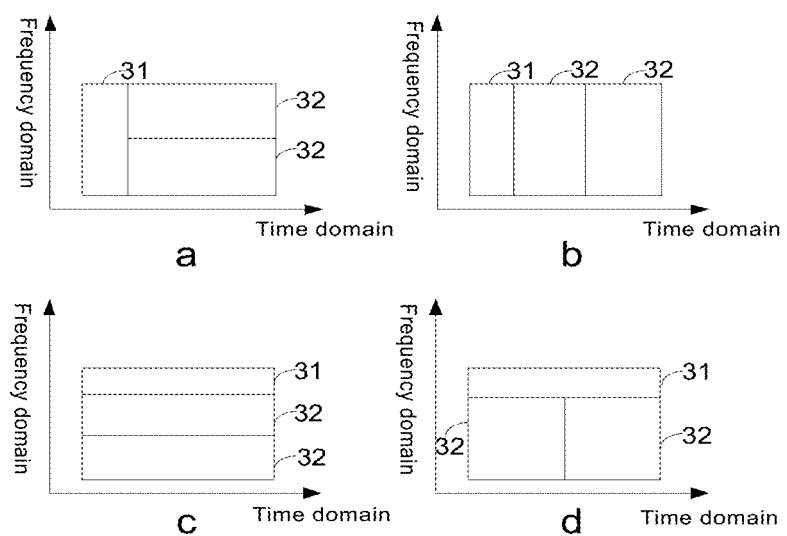
FIG. 9 is yet another schematic structural diagram of resource pools, in accordance with embodiments of the present disclosure.

For example, referring to FIG. 9, a, b, c, and d in FIG. 9 are all shown by taking an example in which one control resource pool and two data resource pools are configured in one resource pool. In a of FIG. 9, the control resource pool and the data resource pool are different in time domain and the same in frequency domain, and two data resource pools are the same in time domain and different in frequency domain; in b of FIG. 9, the control resource pool and the data resource pool are different in time domain and the same in frequency domain, and two data resource pools are different in time domain and the same in frequency domain; in c of FIG. 9, the control resource pool and the data resource pool are the same in time domain and different in frequency domain, and two data resource pools are the same in time domain and different in frequency domain; and in d of FIG. 9, the control resource pool and the data resource pool are the same in time domain and different in frequency domain, and two data resource pools are different in time domain and the same in frequency domain.

Optionally, the way of configuring the control resource pool and the data resource pool in the second target mode includes:
configuring, in one resource pool, only the control resource pool or the data resource pool.

Figure 10:
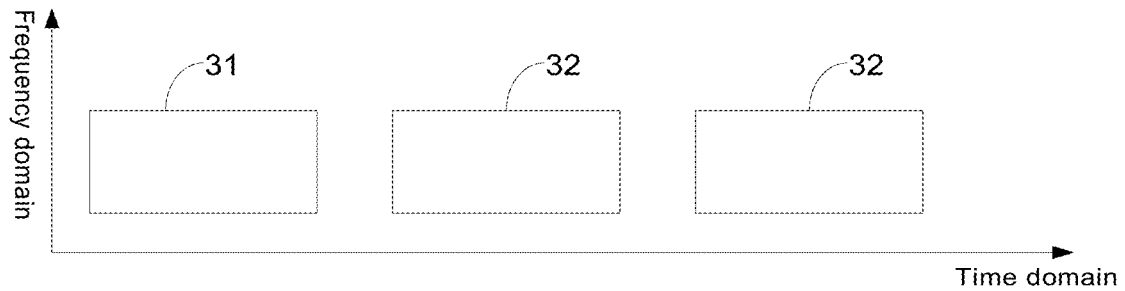
FIG. 10 is yet another schematic structural diagram of resource pools, in accordance with embodiments of the present disclosure.

For example, referring to FIG. 10, FIG. 10 shows an example in which three resource pools are configured, among which one resource pool is configured to be a control resource pool, and two resource pools are configured to be data resource pools. In FIG. 10, a control resource pool 31 and data resource pools 32 are located in different resource pools.

The following will describe a method for the UE to select resources from the control resource pool(s) and the data resource pool(s) that are configured with the second target mode to send transmission control information on the SL and data on the SL.

Figure 11:
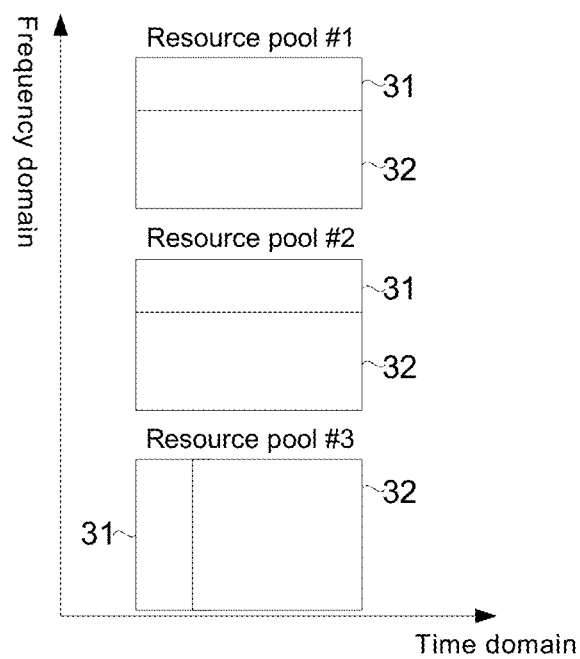
FIG. 11 is yet another schematic structural diagram of resource pools, in accordance with embodiments of the present disclosure.

In the first solution:
the multiplexing mode between the control resource pool and the data resource pool is preconfigured to be the FDM by a network. The resource pools configured with the second target mode are shown in FIG. 11, and include three resource pools (a resource pool #1, a resource pool #2, and a resource pool #3). Each resource pool includes one control resource pool 31 and one data resource pool 32, and the control resource pool and the data resource pool located in a same resource pool are associated. The multiplexing mode between the control resource pools and the data resource pools in the resource pool #1 and the resource pool #2 is the FDM, the multiplexing mode between the control resource pool and the data resource pool in the resource pool #3 is the TDM, so the UE may select the first resource and the second resource in the resource pool #1 or the resource pool #2 to transmit control information and data.

Figure 12:
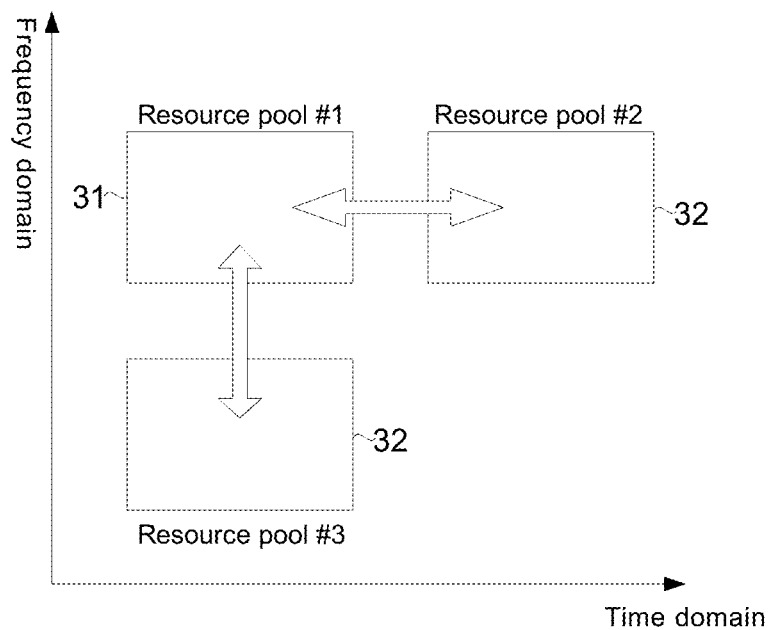
FIG. 12 is yet another schematic structural diagram of resource pools, in accordance with embodiments of the present disclosure.

In the second solution:
the multiplexing mode between the control resource pool and the data resource pool are preconfigured to be the TDM by a network. The resource pools configured with the second target mode are shown in FIG. 12, and include three resource pools (a resource pool #1, a resource pool #2, and a resource pool #3). The resource pool #1 is configured to be a control resource pool, the resource pool #2 and resource pool #3 are configured to be data resource pools, and the control resource pool are associated with the two data resource pools. The multiplexing mode between the resource pool #1 and the resource pool #2 is the TDM, the multiplexing mode between the resource pool #1 and the resource pool #3 is the FDM, so the UE may select the first resource in the resource pool #1 to transmit control information, and select the second resource in the resource pool #2 to transmit data.

In the third solution:
the multiplexing mode between the control resource pool and the data resource pool are defined to be the FDM by the terminal device. The resource pools configured with the second target mode are shown in FIG. 11, and include three resource pools (a resource pool #1, a resource pool #2, and a resource pool #3). Each resource pool includes one control resource pool 31 and one data resource pool 32, and the control resource pool and the data resource pool located in a same resource pool are associated. The multiplexing mode between the control resource pools and the data resource pools in the resource pool #1 and the resource pool #2 is the FDM, the multiplexing mode between the control resource pool and the data resource pool in the resource pool #3 is the TDM, so the UE may select the first resource and the second resource in the resource pool #1 or the resource pool #3 to transmit control information and data.

In the fourth solution:

the multiplexing mode between the control resource pool and the data resource pool are defined to be the FDM by the terminal device. The resource pools configured with the second target mode are shown in FIG. 12, and include three resource pools (a resource pool #1, a resource pool #2, and a resource pool #3). The resource pool #1 is configured to be a control resource pool, the resource pool #2 and the resource pool #3 are configured to be data resource pools, and the control resource pool is associated with the two data resource pools. The multiplexing mode between the resource pool #1 and the resource pool #2 is the TDM, the multiplexing mode between the resource pool #1 and the resource pool #3 is the FDM, so the UE may select the first resource in the resource pool #1 to transmit control information, and select the second resource in the resource pool #3 to transmit data.

In the fifth solution:

the network side device sends an RRC signaling (e.g., SIB). The RRC signaling carries indication information, the indication information carried in the RRC signaling is used to indicate that the multiplexing mode between the control resource pool and the data resource pool is the FDM. The resource pools configured with the second target mode are shown in FIG. 11. Then, the UE may select the first resource or the second resource in a resource pool #1 and a resource pool #2 to transmit control information and data.

In the sixth solution:

the network side device sends an RRC signaling (e.g., SIB). The RRC signaling carries indication information, the indication information carried in the RRC signaling is used to indicate that the multiplexing mode between the control resource pool and the data resource pool is the TDM, and the resource pools configured with the second target mode are shown in FIG. 12. Then, the UE may select the first resource in a resource pool #1 to transmit control information, and select the second resource in a resource pool #2 to transmit data.

In the seventh solution:

the transmitting side terminal device sends an SCI. The SCI carries indication information, the indication information carried in the SCI is used to indicate that the multiplexing mode between the control resource pool and the data resource pool is the FDM. The resource pools configured with the second target mode are shown in FIG. 11. Then, the UE may select the first resource or the second resource in a resource pool #1 and a resource pool #2 to transmit control information and data.

In the eighth solution:

the transmitting side terminal device sends an SCI (e.g., SIB). The SCI carries indication information, the indication information carried in the SCI is used to indicate that the multiplexing mode between the control resource pool and the data resource pool is the TDM. The resource pools configured with the second target mode are shown in FIG. 12. Then, the UE may select the first resource in a resource pool #1 to transmit control information, and select the second resource in a resource pool #2 to transmit data.

In the ninth solution:

the network side device sends a DCI signaling. The DCI signaling carries indication information, the indication information carried in the DCI signaling is used to indicate that the multiplexing mode between the control resource pool and the data resource pool is the FDM. The resource pools configured with the second target mode are shown in FIG. 11. Then, the UE may select the first resource or the second resource in a resource pool #1 and a resource pool #2 to transmit control information and data.

In the tenth solution:

the network side device sends a DCI signaling. The DCI signaling carries indication information, the indication information carried in the DCI signaling is used to indicate that the multiplexing mode between the control resource pool and the data resource pool is the TDM. The resource pools configured in the second target mode are shown in FIG. 12. Then, the UE may select the first resource in a resource pool #1 to transmit control information, and select the second resource in a resource pool #2 to transmit data.

In the eleventh solution:

the transmitting side terminal device sends an SL RRC signaling (e.g., MIB-SL, or MIB-SL-V2X). The RRC signaling carries indication information, the indication information carried in the RRC signaling is used to indicate that the multiplexing mode between the control resource and the data resource pool is the TDM. The resource pools configured with the second target mode are shown in FIG. 12. Then, the UE may select the first resource in a resource pool #1 to transmit control information, and select the second resource in a resource pool #2 to transmit data.

Another embodiment of the present disclosure provides a device for resource configuration. For example, referring to FIG. 13, a device for resource configuration 130 includes:

a first configuration unit 131 used to configure a first resource and a second resource to be multiplexed in a first target mode.

The first resource is a candidate resource, on an SL, configured to transmit control information; the second resource is a candidate resource, on the SL, configured to transmit data; and the first target mode is time-division multiplexing (the TDM) or frequency-division multiplexing (the FDM).

Optionally, the first target mode is predefined by a protocol, or preconfigured by a network, or configured for a terminal device by a network side device, or defined by the terminal device, or configured for a receiving side terminal device by a transmitting side terminal device.

Optionally, the first target mode being configured for the terminal device by the network side device includes:

a multiplexing mode between a resource pool of the first resource and a resource pool of the second resource being configured by the network side device.

Optionally, the first target mode being configured for the terminal device by the network side device includes:

the first target mode being configured for the terminal device by the network side device via a Uu interface.

Optionally, a way that the first target mode is configured for the terminal device by the network side device via the Uu interface includes:
- a radio resource control (RRC) signaling being sent to the terminal device by the network side device via the Uu interface; and the RRC signaling carrying indication information;

or,
- a downlink control information (DCI) signaling being sent to the terminal device by the network side device via the Uu interface; and the DCI signaling carrying indication information.

The indication information is used to indicate the first target mode.

Optionally, a way of carrying the indication information in the RRC signaling includes:
- the indication information being jointly encoded with at least one piece of information in the RRC signaling;

or,
- the RRC signaling including at least one target bit. The target bit is a bit used to carry the indication information.

Optionally, a way of carrying the indication information in the DCI includes:
- the indication information being jointly encoded with at least one piece of information in the DCI;

or,
- the DCI including at least one target bit. The target bit is a bit used to carry the indication information.

Optionally, the first target mode being configured for the receiving side terminal device by the transmitting side terminal device includes:
- the first target mode being configured for the receiving side terminal device by the transmitting side terminal device via a PC5 interface.

Optionally, a way that the first target mode is configured for the receiving side terminal device by the transmitting side terminal device via the PC5 interface includes:
- SL control information (SCI) being sent to the receiving side terminal device by the transmitting side terminal device via the PC5 interface; and the SCI carrying indication information;

or,
- an RRC signaling being sent to the receiving side terminal device by the transmitting side terminal device via the PC5 interface. The RRC signaling carrying indication information.

The indication information is used to indicate the first target mode.

Optionally, a way of carrying the indication information in the SCI includes:
- the indication information being jointly encoded with at least one piece of information in the SCI;

or,
- the SCI including at least one target bit. The target bit is a bit used to carry the indication information.

Optionally, the way of carrying the indication information in the RRC signaling includes:
- the indication information being jointly encoded with at least one piece of information in the RRC signaling;

or,
- the RRC signaling including at least one target bit. The target bit is a bit used to carry the indication information.

Figure 13:
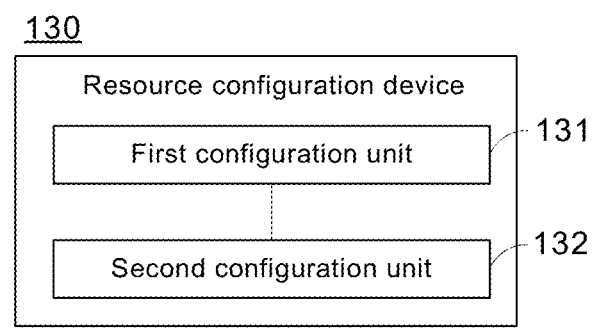
FIG. 13 is a schematic structural diagram of a device for resource configuration, in accordance with embodiments of the present disclosure.

Optionally, referring to FIG. 13, the device 130 further includes:
- a second configuration unit 132 used to configure, with a second target mode, a control resource pool and a data resource pool.

The control resource pool is a resource pool of the first resource, and the data resource pool is a resource pool of the second resource.

Optionally, the second configuration unit 132 is used to configure M control resource pools to be associated with N data resource pools.

M and N are non-negative integers.

Optionally, M and N are both positive integers;
and there is an intersection between a first carrier set and a second carrier set.

The first carrier set is a set composed of carriers on which each control resource pool in the M control resource pools is located; and the second carrier set is a set composed of carriers on which each control resource pool in the N data resource pools is located.

Optionally, M and N are both positive integers;
and there is no intersection between the first carrier set and the second carrier set.

The first carrier set is a set composed of carriers on which each control resource pool in the M control resource pools is located; and the second carrier set is a set composed of carriers on which each control resource pool in the N data resource pools is located.

Optionally, the second configuration unit 132 is used to configure, in one resource pool, at least one control resource pool and at least one data resource pool.

Optionally, the second configuration unit 132 is used to configure, in one resource pool, only the control resource pool or the data resource pool.

In the device for resource configuration provided by the embodiments of the present disclosure, it is determined that the first resource and the second resource are multiplexed in the first target mode. The first resource is the candidate resource on the SL configured to transmit control information, the second resource is the candidate resource on the SL configured to transmit data, and the first target mode is the TDM or the FDM. That is, in the embodiments of the present disclosure, the candidate resource on the SL configured to transmit control information and the candidate resource on the SL configured to transmit data are multiplexed in the TDM mode or the FDM mode. Since the embodiments of the present disclosure provide the multiplexing mode between the candidate resource configured to transmit control information and the candidate resource configured to transmit data, the problem of how to configure the resources on the SL for transmitting control information and for transmitting data may be solved by the embodiments of the present disclosure.

Figure 14:
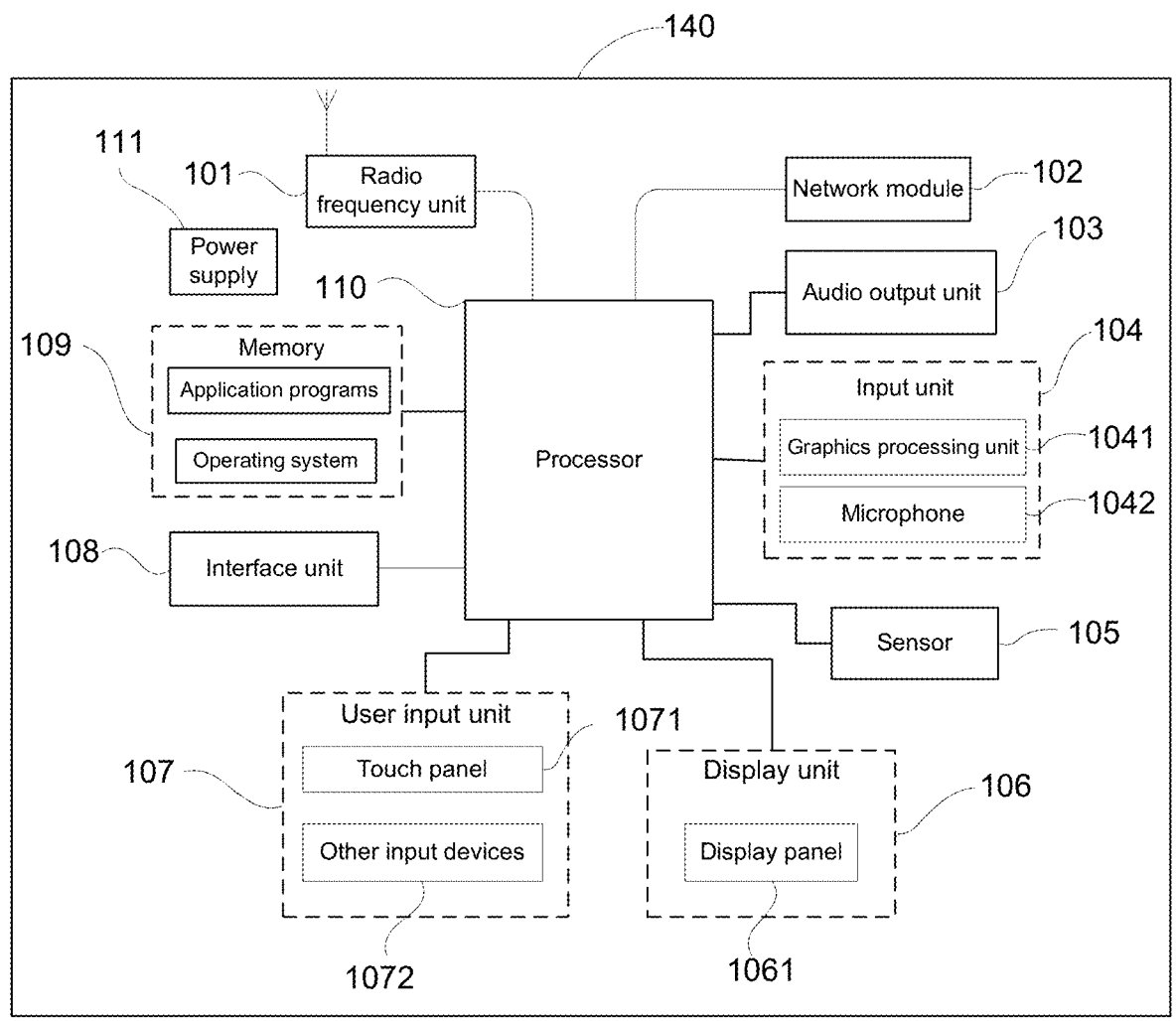
FIG. 14 is a schematic diagram showing a hardware architecture of a device for resource configuration, in accordance with embodiments of the present disclosure.

FIG. 14 is a schematic diagram showing a hardware architecture of a device for resource configuration for implementing the embodiments of the present disclosure. A device for resource configuration 140 includes, but is not limited to, components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art will understand that, a structure of the device for resource configuration shown in FIG. 14 does not constitute a limitation on the device for resource configuration, and the device for resource configuration may include more or fewer components than those shown in the figure, or a combination of certain components, or a different arrangement of components. In the embodiments of the present disclosure, the device for resource configuration includes, but is not limited to, a mobile phone, a tablet computer, a notebook computer, a palmtop computer, a vehicle-mounted terminal, a wearable device and a pedometer.

The radio frequency unit 101 is used to determine that a first resource and a second resource are multiplexed in a first target mode;

where the first resource is a candidate resource configured to transmit control information on an SL, the second resource is a candidate resource configured to transmit data on the SL, and the first target mode is time-division multiplexing (the TDM) or frequency-division multiplexing (the FDM).

It will be understood that, in the embodiments of the present disclosure, the radio frequency unit 101 may be used to receive and transmit signals in a process of receiving and sending information or during a call, for example, receives downlink data from a base station and then transmits the downlink data to the processor 110 for processing; and transmits uplink data to the base station. Generally, the radio frequency unit 101 includes, but is not limited to, an antenna, at least one amplifier, a transceiver, a coupler, a low noise amplifier, and a duplexer. In addition, the radio frequency unit 101 may also communicate with a network and other devices through a wireless communication system.

The device for resource configuration 140 provides a user with wireless broadband access to Internet through the network module 102, such as helping the user send and receive e-mails, browse web pages, and access streaming media.

The audio output unit 103 may convert audio data received by the radio frequency unit 101 or the network module 102 or stored in the memory 109 into audio signals and output the audio signals as sound. Moreover, the audio output unit 103 may also provide audio output associated with a specific function performed by the device for resource configuration 140 (e.g., a call signal reception sound, and a message reception sound, etc.). The audio output unit 103 includes a speaker, a buzzer, and a receiver.

The input unit 104 is used to receive audio or video signals. The input unit 104 may include a graphics processing unit (GPU) 1041 and a microphone 1042. The GPU 1041 processes image data of still pictures or videos obtained by an image capture device (e.g., a camera) in a video capture mode or an image capture mode. The processed image frames may be displayed on the display unit 106. The image frames processed by the GPU 1041 may be stored in the memory 109 (or other storage media) or sent via the radio frequency unit 101 or the network module 102. The microphone 1042 may receive sound and is capable of processing such sound into audio data. The processed audio data may be converted for input into a format that may be transmitted to a mobile communication base station through the radio frequency unit 101 in case of a phone call mode.

The device for resource configuration 140 further includes at least one sensor 105, such as a light sensor, a motion sensor, and other sensors. For example, the light sensor includes an ambient light sensor and a proximity sensor. The ambient light sensor may adjust a brightness of a display panel 1061 according to a brightness of ambient light. The proximity sensor may turn off the display panel 1061 and/or backlight when the device for resource configuration 140 is moved near an ear. As a type of the motion sensor, an accelerometer sensor may detect a magnitude of acceleration in various directions (generally three axes), and may detect a magnitude and a direction of gravity when the accelerometer sensor is still, and may be used to recognize a posture of the device for resource configuration (e.g., switching between a landscape screen and a portrait screen, related games, and magnetometer posture calibration), and recognize related functions (e.g., pedometer and knocking) through vibration. The sensor 105 may further include a fingerprint sensor, a pressure sensor, an iris sensor, a molecular sensor, a gyroscope, a barometer, a hygrometer, a thermometer, or an infrared sensor, and details will not be repeated herein.

The display unit 106 is used to display information input by the user or information provided for the user. The display unit 106 may include the display panel 1061 that may be configured in a form of a liquid crystal display (LCD), an organic light-emitting diodes (OLED), or the like.

The user input unit 107 may be used to receive input numerical or character information and generate input key signals related to user setting and function control of the device for resource configuration. For example, the user input unit 107 includes a touch panel 1071 and other input devices 1072. The touch panel 1071, also referred to as a touch screen, may collect a touch operation by the user on or near the touch panel 1071 (e.g., an operation by the user on or near the touch panel 1071 by using a finger, a touch pen, or any other suitable object or accessory). The touch panel 1071 may include two parts, i.e., a touch detection device and a touch controller. The touch detection device detects a touch position of the user, detects a signal generated by the touch operation, and transmits the signal to the touch controller. The touch controller receives touch information from the touch detection device, converts the touch information into coordinates of a touch point, sends the coordinates of the touch point to the processor 110, and receives and executes a command sent by the processor 110. In addition, the touch panel 1071 may be implemented by various types of touch panels such as a resistive touch panel, a capacitive touch panel, an infrared touch panel, and a surface acoustic wave touch panel. In addition to the touch panel 1071, the user input unit 107 may further include other input devices 1072. For example, the other input devices 1072 may include, but be not limited to, a physical keyboard, function keys (e.g., volume control keys, and a switch key, etc.), a trackball, a mouse, and an operating lever, and details will not be repeated herein.

Further, the touch panel 1071 may cover the display panel 1061. After the touch panel 1071 detects a touch operation on or near it, the touch panel 1071 sends the touch operation to the processor 110 to determine a type of a touch event. Then, the processor 110 provides a corresponding visual output on the display panel 1061 according to the type of the touch event. Although in FIG. 14, the touch panel 1071 and the display panel 1061 are used as two separate components to implement input and output functions of the device for resource configuration, in some embodiments, the touch panel 1071 may be integrated with the display panel 1061 to implement the input and output functions of the device for resource configuration, which is not limited herein.

The interface unit 108 is an interface for connecting an external device to the device for resource configuration 140. For example, the external device may include a wired or wireless headset port, an external power supply (or battery charger) port, a wired or wireless data port, a memory card port, a port for connecting a device with an identification module, an audio input/output (I/O) port, a video I/O port, and an earphone port. The interface unit 108 may be used to receive input (e.g., data information and power) from the external device and transmit the received input to one or more elements in the device for resource configuration 140, or may be used to transmit data between the device for resource configuration 140 and the external device.

The memory 109 may be used to store software programs and various data. The memory 109 may mainly include a program storage region and a data storage region. The program storage region may store an operating system and at least one application program required by functions (e.g., a sound playing function or an image playing function, etc.). The data storage region may store data (e.g., audio data and a phone book) created according to use of a mobile phone. In addition, the memory 109 may include a high-speed random access memory, and may further include a non-volatile memory, such as at least one magnetic disk storage device, a flash memory device, or other volatile solid-state storage device.

The processor 110 is a control center of the device for resource configuration, connects a plurality of parts of the entire device for resource configuration using various interfaces and lines, and performs various functions of the device for resource configuration and processes data by running or executing software programs and/or modules stored in the memory 109 and invoking data stored in the memory 109, thereby performing overall monitoring to the device for resource configuration. The processor 110 may include one or more processing units. Optionally, an application processor and a modem processor may be integrated in the processor 110. The application processor mainly deals with operating systems, user interfaces and application programs, and the modem processor mainly deals with wireless communication. It will be understood that, the modem processor may not be integrated in the processor 110.

The device for resource configuration 140 may further include the power supply 111 (e.g., a battery) to supply power to a plurality of components. Optionally, the power supply 111 may be logically connected to the processor 110 through a power management system, so that functions such as charging management, discharging management and power consumption management are achieved through the power management system.

In addition, the device for resource configuration 140 includes some functional modules that are not shown, which will not be repeated herein.

The embodiments of the present disclosure further provide a device for resource configuration. The device for resource configuration includes a processor 110, a memory 109, and a computer program stored on the memory 109 and executed on the processor 110. The computer program, when executed by the processor 110, implements processes in the method for resource configuration embodiments described above, and can achieve same technical effects, and details will not be repeated herein to avoid repetition.

The embodiments of the present disclosure further provide a non-transitory computer-readable storage medium. The non-transitory computer-readable storage medium stores thereon a computer program that, when executed by a processor, implements processes in the method for resource configuration embodiments described above, and can achieve same technical effects, and details will not be repeated herein to avoid repetition. The non-transitory computer-readable storage medium may include a read-only memory (ROM), a random access memory (RAM), a magnetic disk, or an optical disk.

It will be noted that, the terms such as "comprise" or any other variants thereof herein are intended to cover a non-exclusive inclusion, so that a process, a method, an article or a device that includes a series of elements not only includes those elements, but also includes other elements not explicitly listed, or includes elements inherent to the process, the method, the article or the device. In a case where there is no more limitation, an element defined by the phrase "comprising a/an . . . " does not exclude existence of other identical elements in a process, a method, an article, or a device that includes the element.

Through the description of the above embodiments, a person skilled in the art will clearly understand that, the methods in the above embodiments may be implemented by means of software plus a necessary general-purpose hardware platform, and of course, may be also implemented by hardware, but in many cases, the former is a better implementation. On a basis of such understanding, the technical solution of the present disclosure may be embodied in a form of a software product in essence or in a part contributing to the related art. The computer software product is stored in a storage medium (e.g., a ROM/RAM, a diskette, or an optical disk), and includes several instructions for causing a terminal (which may be a mobile phone, a computer, a server, an air conditioner, or a network side device) to perform the methods described in the embodiments of the present disclosure.

The embodiments of the present disclosure are described above with reference to the accompanying drawings. However, the present disclosure is not limited to the above specific implementation manners. The above specific implementation manners are illustrative only rather than restrictive. Under enlightenment of the present disclosure, a person of ordinary skill in the art may make various forms without departing from a purpose of the present disclosure and the protection scope of the claims, all of which shall all be included in the protection scope of the present disclosure.

What is claimed is:

1. A method for resource configuration, performed by a terminal device, the method comprises:
   determining that a first resource and a second resource are multiplexed in a first target mode;
   wherein the first resource is a candidate resource, on a sidelink (SL), configured to transmit control information; the second resource is a candidate resource, on the SL, configured to transmit data; and the first target mode is time-division multiplexing (TDM) or frequency-division multiplexing (FDM); and
   wherein the first target mode is indicated by indication information carried in downlink control information (DCI) or SL control information (SCI), and the indication information is jointly encoded with at least one piece of information in the DCI or the SCI.

2. The method for resource configuration according to claim 1, wherein the first target mode is predefined by a protocol, or preconfigured by a network, or configured for a terminal device by a network side device, or defined by the terminal device, or configured for a receiving side terminal device by a transmitting side terminal device.

3. The method for resource configuration according to claim 2, wherein the first target mode being configured for the terminal device by the network side device includes:
   a multiplexing mode of a resource pool of the first resource and a resource pool of the second resource being configured by the network side device.

4. The method for resource configuration according to claim 2, wherein the first target mode being configured for the terminal device by the network side device includes:
   the first target mode being configured for the terminal device by the network side device via a Uu interface;

and wherein a way that the first target mode is configured for the terminal device by the network side device via the Uu interface includes:
the DCI being sent to the terminal device by the network side device via the Uu interface.

5. The method for resource configuration according to claim 2, wherein a way that the first target mode is configured for the receiving side terminal device by the transmitting side terminal device includes:
the first target mode being configured for the receiving side terminal device by the transmitting side terminal device via a PC5 interface;
and wherein a way that the first target mode is configured for the receiving side terminal device by the transmitting side terminal device via the PC5 interface includes:
the SCI being sent to the receiving side terminal device by the transmitting side terminal device via the PC5 interface.

6. The method for resource configuration according to claim 1, wherein the method further comprises:
configuring, with a second target mode, a control resource pool and a data resource pool;
wherein the control resource pool is a resource pool of the first resource, and the data resource pool is a resource pool of the second resource.

7. The method for resource configuration according to claim 6, wherein configuring, with the second target mode, the control resource pool and the data resource pool includes:
configuring M control resource pools to be associated with N data resource pools;
wherein M an d N are non-negative integers.

8. The method for resource configuration according to claim 7, wherein M and N are both positive integers;
there is an intersection between a first carrier set and a second carrier set;
the first carrier set is a set composed of carriers on which each control resource pool in the M control resource pools is located; and the second carrier set is a set composed of carriers on which each control resource pool in the N data resource pools is located.

9. The method for resource configuration according to claim 7, wherein M and N are both positive integers;
there is no intersection between a first carrier set and a second carrier set;
the first carrier set is a set composed of carriers on which each control resource pool in the M control resource pools is located; and the second carrier set is a set composed of carriers on which each control resource pool in the N data resource pools is located.

10. The method for resource configuration according to claim 6, wherein configuring, with the second target mode, the control resource pool and the data resource pool includes:
configuring, in one resource pool, at least one control resource pool and at least one data resource pool.

11. The method for resource configuration according to claim 6, wherein configuring, with the second target mode, the control resource pool and the data resource pool includes:
configuring, in one resource pool, only the control resource pool or the data resource pool.

12. A terminal device comprising a processor, a memory, and a computer program stored in the memory and executed on the processor, wherein the computer program, when executed by the processor, causes the terminal device to perform following step:
determining that a first resource and a second resource are multiplexed in a first target mode;
wherein the first resource is a candidate resource, on a sidelink (SL), configured to transmit control information; the second resource is a candidate resource, on the SL, configured to transmit data; and the first target mode is time-division multiplexing (TDM) or frequency-division multiplexing (FDM); and
wherein the first target mode is indicated by indication information carried in downlink control information (DCI) or SL control information (SCI), and the indication information is jointly encoded with at least one piece of information the DCI or the SCI.

13. The terminal device according to claim 12, wherein the first target mode is predefined by a protocol, or preconfigured by a network, or configured for the terminal device by a network side device, or defined by the terminal device, or configured for a receiving side terminal device by a transmitting side terminal device.

14. The terminal device according to claim 13, wherein the first target mode being configured for the terminal device by the network side device includes:
a multiplexing mode of a resource pool of the first resource and a resource pool of the second resource being configured by the network side device.

15. The terminal device according to claim 13, wherein the first target mode being configured for the terminal device by the network side device includes:
the first target mode being configuring for the terminal device by the network side device via a Uu interface;
and wherein a way that the first target mode is configured for the terminal device by the network side device via the Uu interface includes:
the DCI signaling being sent to the terminal device by the network side device via the Uu interface.

16. The terminal device according to claim 13, wherein a way that the first target mode is configured for the receiving side terminal device by the transmitting side terminal device includes:
the first target mode being configured for the receiving side terminal device by the transmitting side terminal device via a PC5 interface;
and wherein a way that the first target mode is configured for the receiving side terminal device by the transmitting side terminal device via the PC5 interface includes:
the SCI being sent to the receiving side terminal device by the transmitting side terminal device via the PC5 interface.

17. A non-transitory computer-readable storage medium storing a computer program that, when executed by a processor, implements following step:
determining that a first resource and a second resource are multiplexed in a first target mode;
wherein the first resource is a candidate resource, on a sidelink (SL), configured to transmit control information; the second resource is a candidate resource, on the SL, configured to transmit data; and the first target mode is time-division multiplexing (TDM) or frequency-division multiplexing (FDM); and
wherein the first target mode is indicated by indication information carried in downlink control information (DCI) or SL control information (SCI), and the indication information is jointly encoded with at least one piece of information in the DCI or the SCI.

* * * * *